(12) United States Patent
Tanton

(10) Patent No.: US 7,024,261 B1
(45) Date of Patent: Apr. 4, 2006

(54) MODULAR AUTOMATION APPARATUS

(76) Inventor: Chris D. Tanton, 4803 Clarkston Rd., Clarkston, MI (US) 48348

( * ) Notice: Subject to any disclaimer, the term of this patent is extended or adjusted under 35 U.S.C. 154(b) by 744 days.

(21) Appl. No.: 10/023,354

(22) Filed: Dec. 17, 2001

(51) Int. Cl.
*G06F 19/00* (2006.01)

(52) U.S. Cl. .................... 700/96; 700/117; 700/128; 700/169; 29/563; 29/564; 29/701; 361/729; 361/732; 52/749.1

(58) Field of Classification Search ............... 361/732, 361/729; 700/169, 245, 170, 3, 69, 117, 700/128; 29/701, 563–564; 52/749.1
See application file for complete search history.

(56) References Cited

U.S. PATENT DOCUMENTS

| | | | |
|---|---|---|---|
| 4,035,904 A | 7/1977 | Ishizaka et al. | 29/563 |
| 4,698,766 A | 10/1987 | Entwistle et al. | 364/468 |
| 4,787,128 A | 11/1988 | Wickham | 29/33 |
| 5,186,304 A | 2/1993 | Kaczmarek et al. | 198/346.1 |
| 5,353,490 A | 10/1994 | Kukuljan | 29/564 |
| 5,443,017 A | 8/1995 | Wacker et al. | 108/3 |
| 5,539,975 A * | 7/1996 | Kukuljan et al. | 29/701 |
| 5,600,542 A * | 2/1997 | Malgouires | 361/732 |
| 5,898,243 A | 4/1999 | Dona et al. | 310/12 |
| 5,920,974 A * | 7/1999 | Bullen | 29/33 K |
| 5,943,750 A | 8/1999 | Koren et al. | 29/26 A |
| 6,064,721 A | 5/2000 | Mohammadian et al. | 379/21 |
| 6,081,986 A | 7/2000 | Miyano | 29/563 |
| 6,094,793 A | 8/2000 | Szuba | 29/33 P |
| 6,101,419 A * | 8/2000 | Kennedy et al. | 700/3 |
| 6,442,451 B1* | 8/2002 | Lapham | 700/245 |
| 6,535,786 B1* | 3/2003 | Duemler | 700/169 |
| 6,556,888 B1* | 4/2003 | Kantola | 700/222 |
| 6,574,520 B1* | 6/2003 | Liu et al. | 700/96 |
| 2003/0004594 A1* | 1/2003 | Liu et al. | 700/95 |
| 2003/0005561 A1* | 1/2003 | Hahn et al. | 29/25.01 |
| 2003/0083768 A1* | 5/2003 | Duemler | 700/108 |
| 2003/0125821 A1* | 7/2003 | Trotter et al. | 700/53 |
| 2003/0193784 A1* | 10/2003 | Bet et al. | 361/729 |
| 2004/0226257 A1* | 11/2004 | Jaeger | 52/749.1 |

FOREIGN PATENT DOCUMENTS

| | | |
|---|---|---|
| EP | 0488312 A1 | 11/1991 |
| EP | 0654721 A1 | 12/1991 |
| EP | 0419585 B1 | 7/1995 |
| WO | WO 90/05594 | 5/1990 |
| WO | WO 01/48416 A1 * | 5/2001 |

* cited by examiner

*Primary Examiner*—Anthony Knight
*Assistant Examiner*—Ronald D Hartman, Jr.
(74) *Attorney, Agent, or Firm*—Rader, Fishman & Grauer, PLLC

(57) ABSTRACT

A modular automation apparatus is provided that includes a base unit adapted to receive an automation module. The automation module includes at least one automation device for performing one or more specific automation functions and preferably a selectively programmable memory device for storing automation specific logic rules and/or controlling the specific automation functions. The base unit includes a frame having affixed thereto a control cabinet that houses a programmable logic controller (PLC) for executing the logic rules relayed or stored in the memory device and a power supply capable of powering the base unit and the automation module. When a base unit and an automation module are cooperatively assembled, the combination is capable of performing one or more automation functions specific to the automation module selected.

27 Claims, 6 Drawing Sheets

MODULAR AUTOMATION APPARATUS

FIELD OF THE INVENTION

The present invention relates generally to industrial automation equipment and, more particularly, to a modular automation apparatus for performing automated manufacturing-related processes.

BACKGROUND OF THE INVENTION

Industrial automation equipment used in manufacturing is known in the art. Traditionally, product assembly and verification processes have been preformed by custom designed automation equipment dedicated to a particular automation function or task. In accordance with this approach, the manufacture of traditional automation equipment involved the design and construction of a single machine having its own controls, sensors and automation devices in one unit. A drawback of this approach is that once these machines are constructed, they are highly specialized for a particular automation function rendering them unusable for different automation functions without extensive reconstruction or overhaul. Moreover, once a traditional automation machine reached the end of its production cycle, the entire machine would typically be scrapped including the expensive controls and sensors.

SUMMARY OF THE INVENTION

The present invention overcomes the shortcomings of traditional automation equipment by providing a modular automation apparatus comprising a base unit that includes automation controls and a separate automation module that includes at least one automation device. In accordance with a preferred embodiment of the present invention, the automation module includes a frame having a platform upon which the automation device is disposed for performing one or more specific automation functions. The automation module preferably also includes at least one selectively programmable memory device for storing automation specific logic rules and/or data used to control the specific automation functions. The base unit includes a frame that preferably includes a control cabinet that houses at least one control device. In a preferred embodiment, the control cabinet includes at least two control devices comprising a programmable logic controller (PLC) for executing the logic rules stored in the memory device and at least one power supply capable of powering the base unit and/or the automation module. Preferably, an electrical conduit is provided between the base unit and the automation module to allow for power distribution and communication. Generally, upon connection of the electrical conduit to the automation module, the memory device downloads the stored logic rules into the PLC for execution. When a base unit and an automation module are cooperatively assembled, the combination is capable of performing one or more automation functions specific to the automation module selected.

Among other advantages, the present invention helps eliminate the unnecessary scrapping of expensive control devices at the end of a production run. Another advantage is that one base unit can run a theoretically unlimited number of automation modules, thereby reducing the amount of floor space used in a manufacturing facility. The inventive automation apparatus allows a user to advantageously reduce downtime for system debugging or failure isolation by removing an automation module and testing it on a separate and often substantially identical or similar base unit. The present invention allows for shorter production/delivery times since only an automation module needs to be manufactured if a base unit is already in operation.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
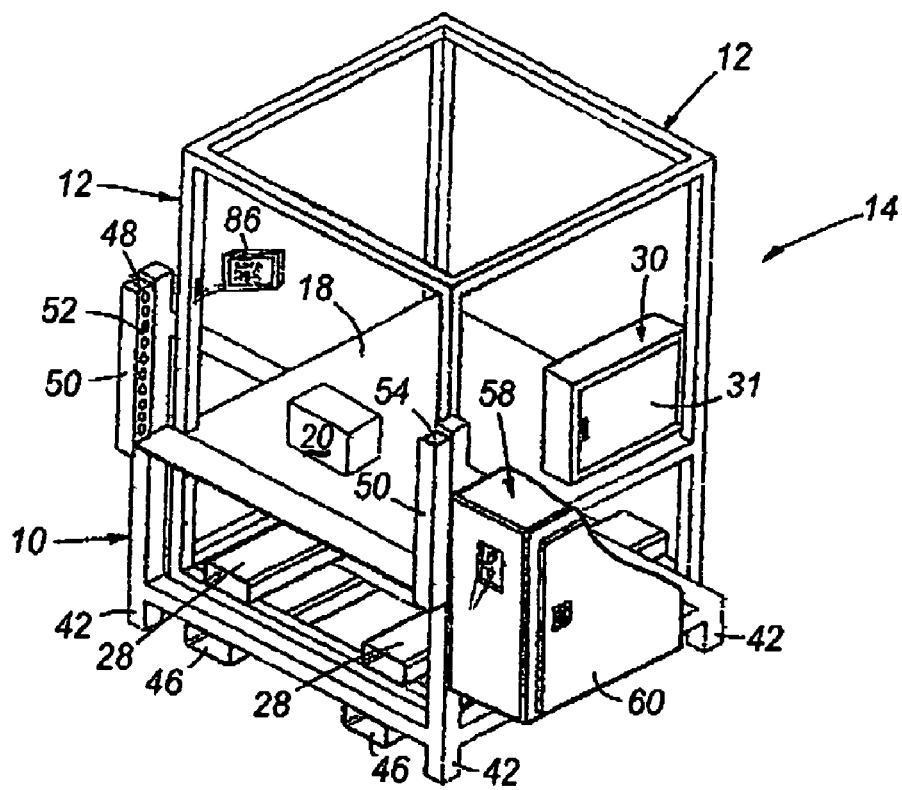
FIG. 1 is a perspective view of a modular automation apparatus according to a preferred embodiment of the present invention.

Referring now to the drawings, the preferred embodiments of the present invention are described in detail. The term "automation" as used herein shall refer to the controlled operation of an apparatus, process, or system by mechanical and/or electronic devices that supplement or take the place of human observation, effort, and decision.

Referring to FIG. 1 of the drawings, a preferred embodiment of the present invention is shown that includes a base unit 10 and an automation module 12 that are conveniently and cooperatively assembled into a unitary automation apparatus 14. Typically, given the potentially large size and weight of the mating components 10 and 12, it is desirable that the automation modules be readily and conveniently assembled and disassembled from base unit 10. In an embodiment of the present invention, base unit 10 and automation module 12 are conveniently assembled into a unitary automation apparatus by sliding or otherwise "inserting" a selected automation module 12 (e.g., laterally and/or vertically) into base unit 10 or substantially thereon. The combination of base unit 10 and automation module 12 provide the user with the selective ability to perform one or more predetermined automation functions involving, inter alia, the assembly, manufacture and/or verification of a manufactured product. It will be appreciated that a single base unit 10 may be configured to control an unlimited number of automation modules 12, each automation module 12 capable of being configured to perform one or more automation functions. Advantageously, the multi-piece structure of automation apparatus 14 allows automation module 12 to be separately or independently scrapped at the end of its operating life, thereby potentially resulting in significant cost savings for the owner.

Figure 2:
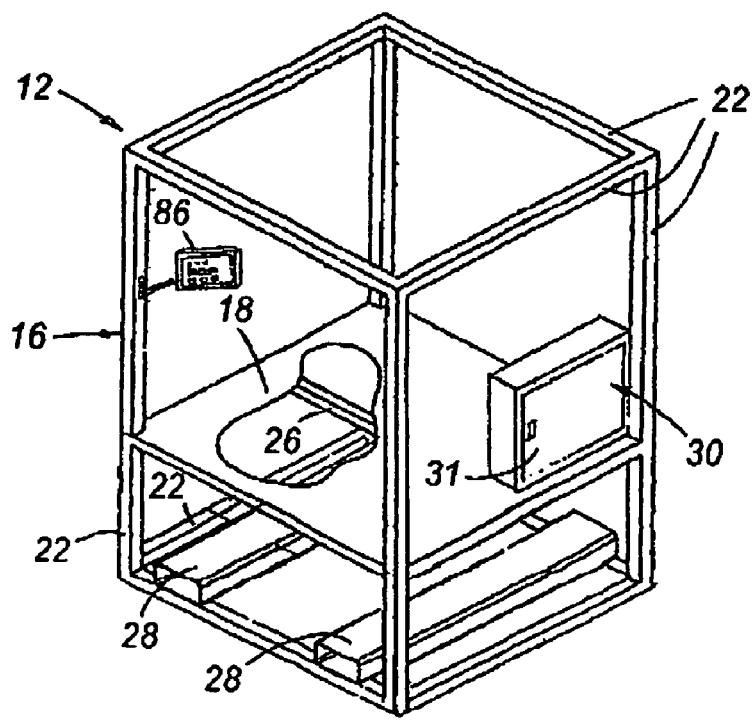
FIG. 2 is a perspective view of an automation module according to a preferred embodiment.

Referring to FIG. 2 of the drawings, a preferred embodiment of automation module 12 is illustrated. Automation module 12 generally comprises a frame 16 having a platform 18 upon which the customized automation portion of automation module 12 is disposed. The platform 18 is preferably raised for convenience, but it is not required to be. The customized automation portion generally includes at least one automation device 20 that is configured to perform a predetermined automation function in association with and/or under the control of base unit 10. It may be appreciated by those skilled in the art of industrial automation equipment that the customized automation portion of automation module 12 may comprise an unlimited number of configurations, each configuration designed to perform one or more automation functions. Exemplary automation functions include, but are not limited to, machining, packaging, material handling, automated assembly and product verification.

Frame 16 is preferably rigid and constructed of joined tubular members 22 comprising a metal, such as steel. In a preferred embodiment, tubular members 22 are joined such that a rectangular cage is formed both above and below a raised platform 18. Depending on the weight of the automation device(s) 20 disposed on platform 18, platform 18 may include additional tubular cross-members 26. Although not a requirement, each automation module 12 is preferably built to the same or similar physical dimensions permitting the automation modules 12 to fit into a common (or if desired, "standardized"base unit 10. Additionally, automation module 12 preferably includes at least two formations or receptacles 28 fixedly secured to frame 16. The formations 28, such as tubular receptacles, may be configured to readily accept the forks of a typical forklift or other mechanical apparatus to conveniently move automation module 12 about a manufacturing facility.

Automation module 12 preferably further includes a cabinet 30 that houses the various electrical components that reside on automation module 12. Cabinet 30 may be comprised of a sheet metal enclosure that can be accessed through an outward-opening door 31. While an exemplary size and location of cabinet 30 is illustrated in FIG. 2 of the drawings, it is recognized that cabinet 30 may be of any suitable size and reside in any suitable location on or about an automation module 12, including underneath platform 18.

Figure 3:
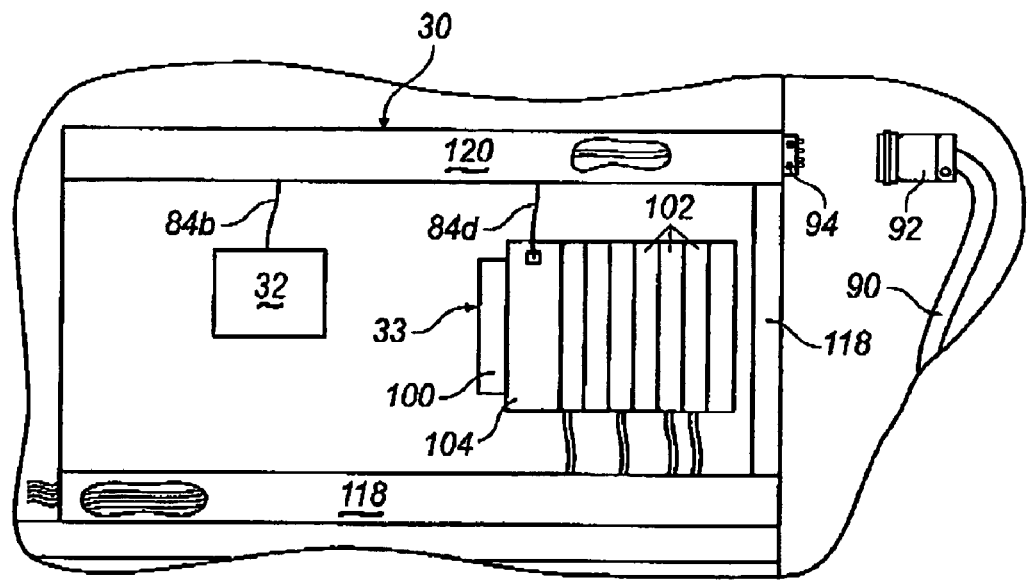
FIG. 3 is an interior view of a cabinet located on the automation module of FIG. 2.

Referring to FIG. 3 of the drawings, the preferred embodiment of an interior of cabinet 30 is shown in more detail. Preferably, cabinet 30 houses at least one selectively programmable memory device 32 that provides a means of storing control information, such as, for example, automation specific logic rules for controlling the automation functions of automation module 12 and/or data used in the execution of the logic rules. The logic rules programmed into memory device 32 are preferably in the form of an industrial control program, such as a ladder logic program, for use by base unit 10 to generate electronic control signals to operate a docked automation module 12. In a preferred embodiment, memory device 32 comprises an electrically erasable programmable read only memory (EEPROM) chip. However, those skilled in the art will appreciate that other programmable memory devices, such as an EPROM chip or other flash memory device, may also be employed. As illustrated in FIG. 3, cabinet 30 may further include additional electronic equipment, such as a remote input/output (I/O) device 33, as will be described in further detail below.

Figure 4A:
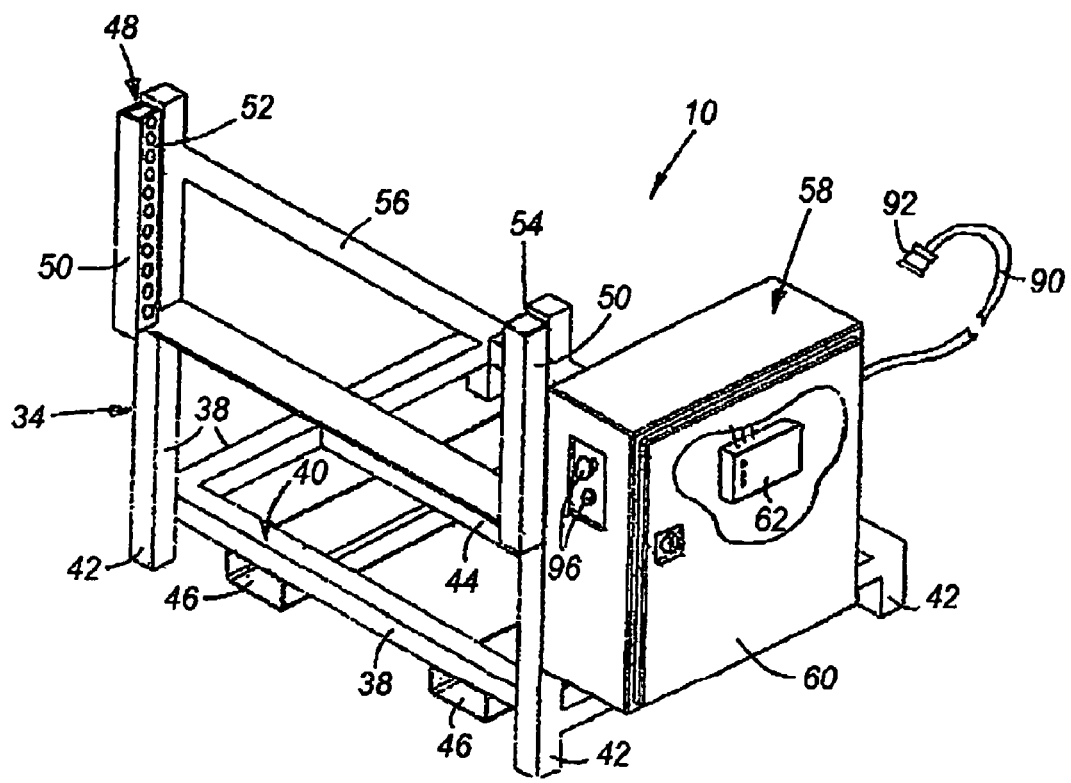
FIG. 4 is a perspective view of a base unit according to a preferred embodiment.
Figure 4B:
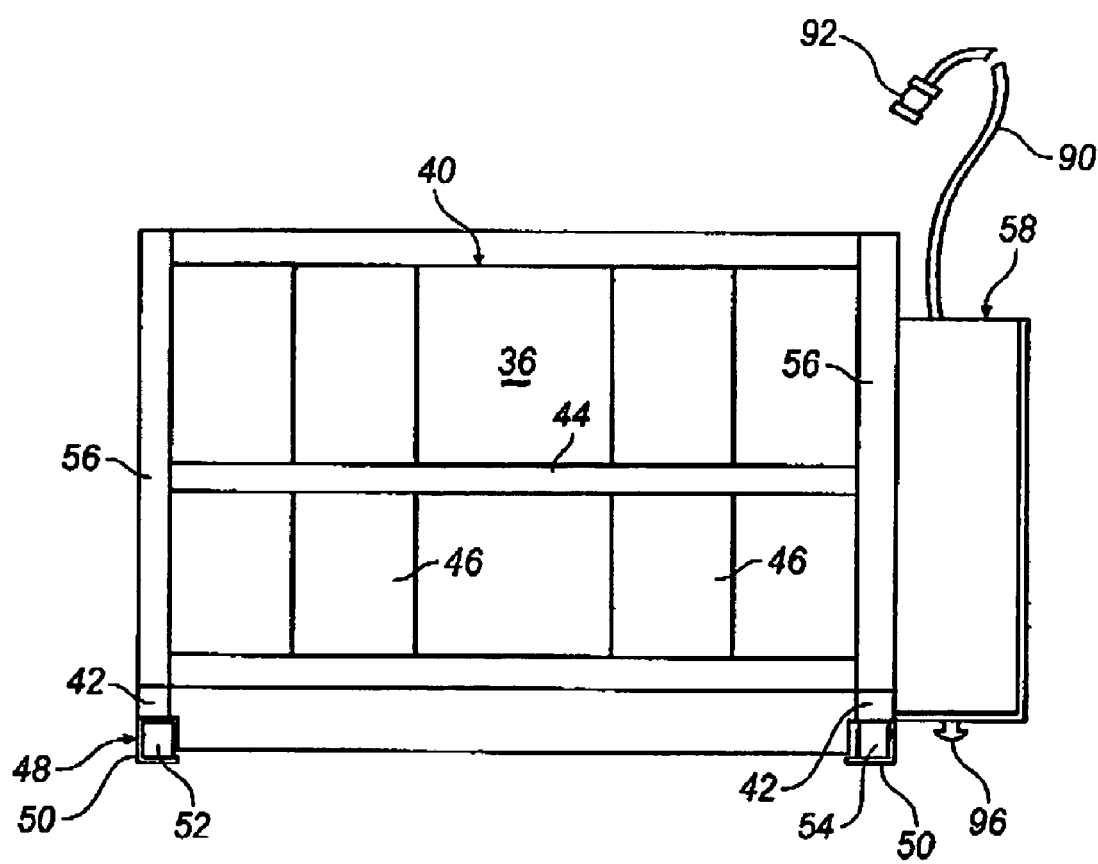

Referring to FIGS. 4A and 4B of the drawings, a preferred embodiment of base unit 10 is shown. Base unit 10 generally comprises a frame 34 defining a docking bay 36 (FIG. 4B) for receiving automation module 12. Frame 34 is preferably rigid and constructed of joined tubular members 38 comprising a metal, such as steel. In a preferred embodiment, tubular members 38 are joined such that a rectangular-shaped platform 40 is created that is supported by a plurality of legs 42 fixed proximate the corners of platform 40. Platform 40 preferably includes one or more cross-members 44 to provide additional support for the weight of automation module 12. If desired, base unit 10 may further include one or more formations (such as tubular receptacles) 46 fixedly secured beneath platform 40. The formations 46 can be configured to readily accept the forks of a typical forklift apparatus or other mechanical device to conveniently move base unit 10 about a manufacturing facility. Frame 34 may also be configured to house fluid power lines (not illustrated), such as hydraulic or pneumatic lines, for providing fluid power to automation device(s) 20 located on automation module 12.

Referring to FIG. 4A of the drawings, a safety device and/or means for attaching a safety device can readily be incorporated into the structure of the frame 34 for use in connection with the present invention. By way of example, and without limitation, two or more legs 42 may extend upwardly beyond platform 40 to provide a means of supporting at least one safety device 48. In a preferred embodiment, an "L" shaped support frame 50 can be attached to each leg 42 that extends beyond platform 40 as a means of securing components of safety device 48 to frame 34. Moreover, if desired, one or more diagonally placed cross-members 56 may be affixed to frame 34 to provide support for safety device 48 and to prevent lateral movement of automation module 12 while docked with base unit 10.

Although numerous types of safety devices may be used in connection with the present invention, in a preferred embodiment, safety device 48 comprises a two-piece light curtain sensor having a light beam emitter 52, that transmits a plurality of light beams, and a laterally separated receiver 54. Safety device 48 is configured to terminate operation of automation module 12 when a user reaches into automation module 12 and interrupts the plurality of light beams during a predetermined event. A "predetermined event", as referred to in this disclosure, may include any function performed by automation module 12 that could result in injury to a user or to the automation apparatus 14. Moreover, other or additional safety devices, such as conventional anti-tie down devices or electronic stop devices, may be employed in place of or in conjunction with safety device 48 to prevent operation of automation apparatus 14 during a predetermined event.

Referring still to FIG. 4A of the drawings, base unit 10 preferably includes a control cabinet 58 for housing electrical power distribution and/or control devices used in connection with automation apparatus 14. The term "control device", as referred to in this disclosure, includes an electrical or electromechanical device employed by base unit 10 to control operation of automation apparatus 14. In a preferred embodiment, the control devices located in control cabinet 58 comprise at least one programmable logic controller (PLC) 62, at least one electrical power supply 64, electrical terminal strips 66 for making electrical control and power distribution connections with an automation module 12 and cycle initiation controls 68. Control cabinet 58 may include additional control devices to accommodate additional features present on base unit 10 and/or automation module 12. These additional control devices typically include, but are not limited to, controller(s) for automation device(s) 20, safety devices, relays for the safety devices and other devices used to control operation of the customized portion of automation module 12. Additional control devices may be employed when PLC 62 is not solely capable of controlling a specific automation device 20 or function as desired. For example, if automation device 20 comprises a welding device, a transformer may be provided in control cabinet 58 to assist power supply 64 in providing the specific type or level of electric power need to operate the welding device.

Figure 5:
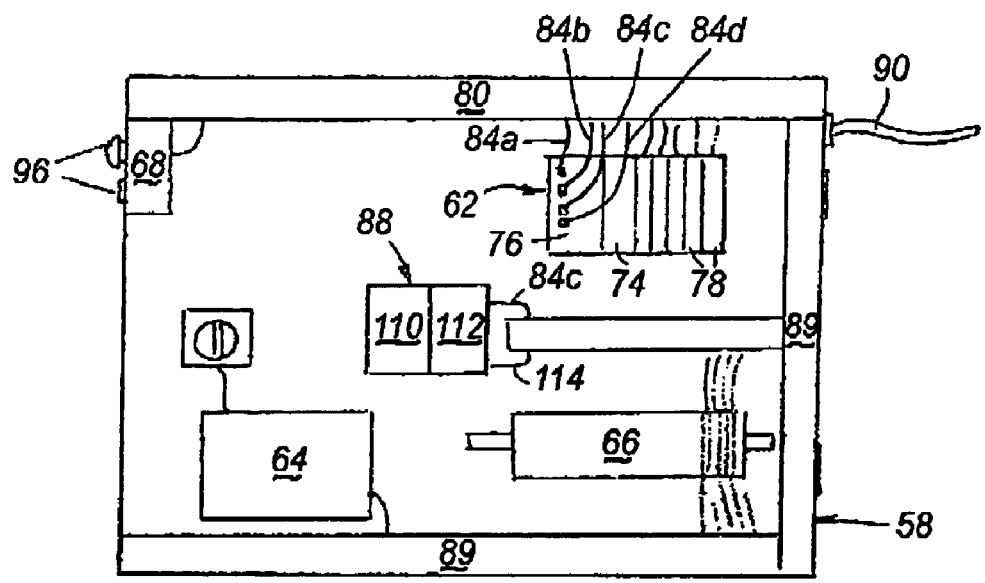
FIG. 5 is an interior view of a control cabinet located on the base unit of FIG. 4.

In a preferred embodiment, control cabinet 58 comprises a sheet metal enclosure that can be accessed through an outward-opening door 60. Referring to FIG. 5 of the drawings, the interior of control cabinet 58 is shown in more detail. PLC 62 may be of a conventional type that typically includes a power supply 74, a logic processor module 76 and at least one I/O module 78, or any other type of programmable logic controller known in the art. PLC 62 executes control instructions in the form of an industrial control program resident in the memory of logic processor module 76 to examine the state of selected inputs and thereafter control the state of selected outputs depending on the state of one or more inputs. In a preferred embodiment, PLC 62 is capable of examining large numbers of inputs while at the same time controlling a large number of outputs. Alternatively, cabinet 30 in automation module 12 may house a remote I/O rack 33, allowing the input and output functions related to the control program of PLC 62 to be resident in automation module 12.

The wiring by which PLC 62 is connected to automation module 12, and more particularly to automation device(s) 20, is generally directed through a casing 80 in which a plurality of terminal strips are mounted for establishing the required electrical interconnections. Communication lines 84*a* and 84*b* connect communication ports on PLC 62 to a user interface 86 and memory device 32, respectively, via conventional network communication links. When included, an additional control element 88, such as an automation device controller, and remote I/O rack 33 are connected to PLC 62 via communication lines 84*c* and 84*d*, respectively. Power for the electrical components of base unit 10 and automation module 12 is distributed from power supply 64 via casing 89. The various power and communication lines pass through casings 80 and 89 into an electrical conduit 90 that houses the wiring by which the control cabinet 58 (control elements) is electronically connected to automation module 12.

In a preferred embodiment, electrical conduit 90 comprises a flexible tube that is connected on one end to control cabinet 58 and on an opposite end to a conventional female electrical connector 92 that is configured to mate with a male connector 94 located on cabinet 30, as shown in FIG. 3. Alternatively, the communication lines 84*a*, 84*b* and 84*d* may be provided in an electrical conduit separate from the power distribution lines to prevent interference in the communication signals. Further, if desired, communication between base unit 10 and automation unit 12 may be made via wireless technology, such as, for example, with a radio transmitter and receiver or by using other conventional forms of "wireless" communication technologies.

Generally, in a preferred embodiment, upon receipt of automation module 12 into docking bay 36 of base unit 10, a user physically connects electrical conduit 90 to the docked automation module 12 to enable communication and power distribution between base unit 10 and the docked automation module 12. Preferably, the logic rules present in memory device 32 are automatically downloaded into PLC 62 for execution, upon connection of electrical conduit 90. Alternatively, PLC 62 may include a means of storing downloaded logic rules in non-volatile memory and the corresponding operating software needed to determine whether a particular automation module 12 has previously been docked. In this manner, when the operating software in PLC 62 detects the connection of an automation module 12 to base unit 10, the base unit 10 can poll the automation module 12 to determine the identity of the automation module 12 and automatically utilize stored operating instructions if it is determined that the automation module 12 has been previously docked. If the polled automation module 12 has not previously been docked, the new operating instructions may be downloaded into non-volatile memory in base unit 10.

Referring again to FIG. 2 of the drawings, automation module 12 may further include a user interface 86 mounted to frame 16. User interface 86 is preferably configured to prompt a user with respect to the performance of predetermined operation steps and may, but not necessarily, accept user input responsive to prompting by PLC 62. In a preferred embodiment, user interface 86 comprises a touch sensitive display that is configured to receive and transmit control signals to and from PLC 62. The touch sensitive display is preferably configured to graphically display operating information, such as equipment fault notices, in response to signals from PLC 62.

While user interface 86 preferably comprises a touch sensitive display, it may be appreciated by those skilled in the art that other graphical display and input devices may be utilized, such as a CRT and keyboard for example. Further, if desired, voice recognition software can be employed alone or in combination with visual displays. In addition to the user control features described, user interface 86 and/or control cabinet 58 may include a set of power control pushbuttons 96 for manually turning automation apparatus 14 on and off.

The present invention advantageously permits a great deal of flexibility in accomplishing an unlimited number of automation tasks using a limited number of control devices. In operation, one base unit 10 may operate an unlimited number of automation modules 12 each configured to perform at least one automation function in accordance with the downloaded programs executed by the PLC 62. As described above, exemplary automation functions include, but are not limited to, machining, packaging, material handling, automated assembly and product verification. While operation of the base unit 10 will be described with reference to an automation module 12 containing a vision system for product verification, the illustrative automation function is not intended to be so limited. It may be appreciated by those skilled in the art that other automation modules, having different automation devices and/or functions, may be used in connection with a base unit 10.

In a further illustrative example of the operation of automation apparatus 14 according to the present invention, a user configurable vision system for the inspection of process materials, such as sheet metals, textiles, paper, and plastics, or manufactured products such as microprocessors may be included with automation module 12. Vision systems are known in the art and typically provide verification capability to determine if particular characteristics of an article conform to predetermined acceptable characteristics preprogrammed into the vision system.

Figure 6:
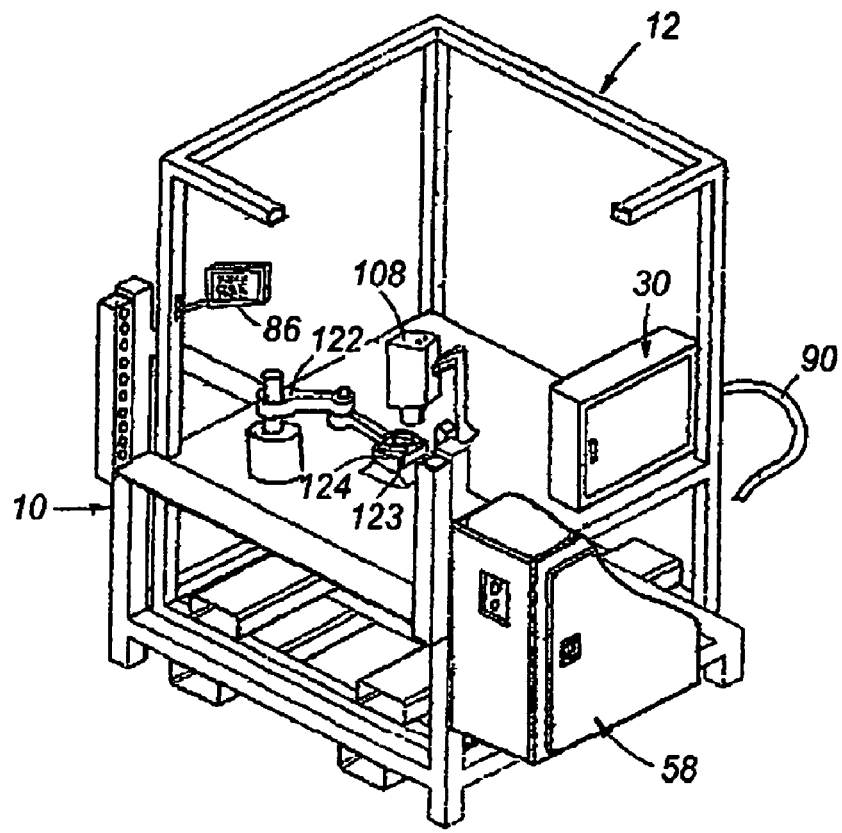
FIG. 6 is a perspective view of a base unit and automation module according to an illustrative embodiment of the present invention.

Referring to FIGS. 3, 5 and 6 of the drawings, an illustrative embodiment of automation apparatus 14 is shown in more detail. As illustrated in FIG. 3, cabinet 30 in automation module 12 preferably houses a conventional remote I/O rack 33 comprising a power supply module 100, at least one I/O module 102 and a communications module 104. The communications module 104 links the remote I/O rack 33 to PLC 62 in control cabinet 58 by way of communications cable 84d. As illustrated in FIG. 5, control cabinet 58 in base unit 10 may house a vision control unit 88 comprising a user-configurable vision control unit that is adapted to receive video input from one or more camera (or other vision-related capturing device) 108 (FIG. 6), which may be located on a raised deck 18. The vision control unit 88 generally includes a power supply module 110 and at least one vision control module 112 having the capability of functioning with multiple cameras 108. The vision control module 112 can be separately connected by video communication cable 114 to video camera 108 located on raised deck 18. The vision control module 112 can operate under the direction of PLC 62 and communicate with PLC 62 via communications cable 84c. Alternatively, vision control unit 88 may be located in cabinet 30 on automation module 12 and may communicate with PLC 62 via the remote I/O rack 33.

As illustrated in FIG. 3, the wiring by which remote I/O rack 33 and vision control unit 64 communicate with automation device(s) (e.g. video camera 108) is generally directed through a casing 118 within which a plurality of terminal strips are mounted for establishing electrical interconnections. The power and communications lines for memory device 32 and remote I/O rack 33 can pass through a casing 120 into electrical conduit 90 for communication with control cabinet 58.

Referring to FIG. 6 of the drawings, an automation module 12 containing a vision system is shown docked with base unit 10. Preferably, upon connection of electrical conduit 90, memory module 32 automatically downloads the preprogrammed logic rules and/or data into logic processor module 76 in PLC 62. PLC 62 is typically responsible for the overall coordination and control of automation apparatus 14 including camera 108 and user interface 86. Other automation devices, such as a loading/unloading mechanism 122, may also be included on platform 18 to assist in handling an article 121 to be inspected. Such automation devices may be controlled by PLC 62 via remote I/O rack 33 in the absence of a specific device controller. A typical vision system, such as the one described herein, is designed such that vision control unit 88 receives input from camera 108 and in response performs various recognition functions with respect to which it transfers data to PLC 62. After inspection of article 121, PLC 62 may perform a predetermined control function, such as instructing loading/unloading mechanism 122 to discard article 121.

Figure 7:
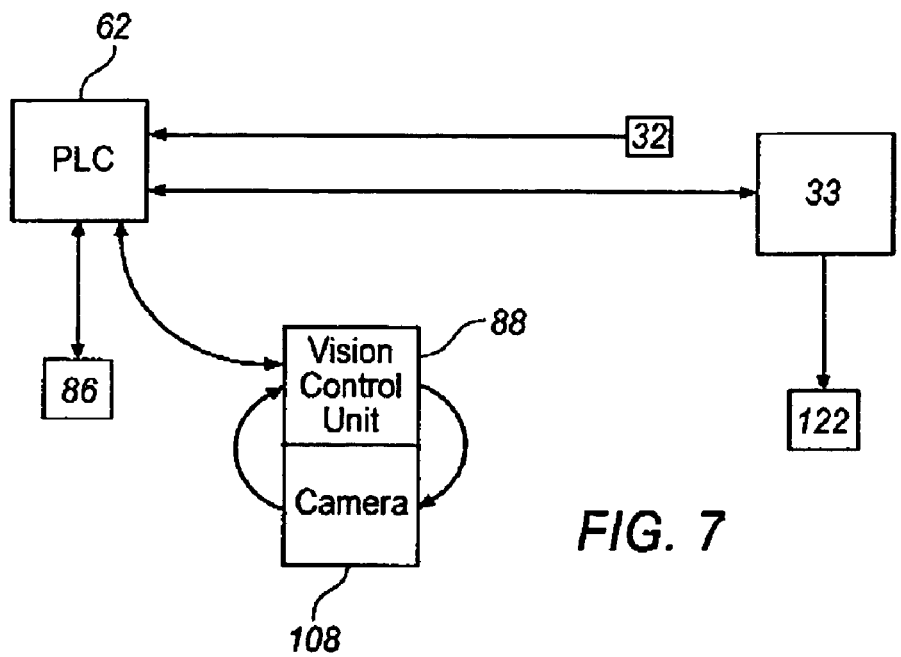
FIG. 7 is a block diagram showing an example of the flow of control signals associated with the control of the automation module of FIG. 6.
Figure 8:
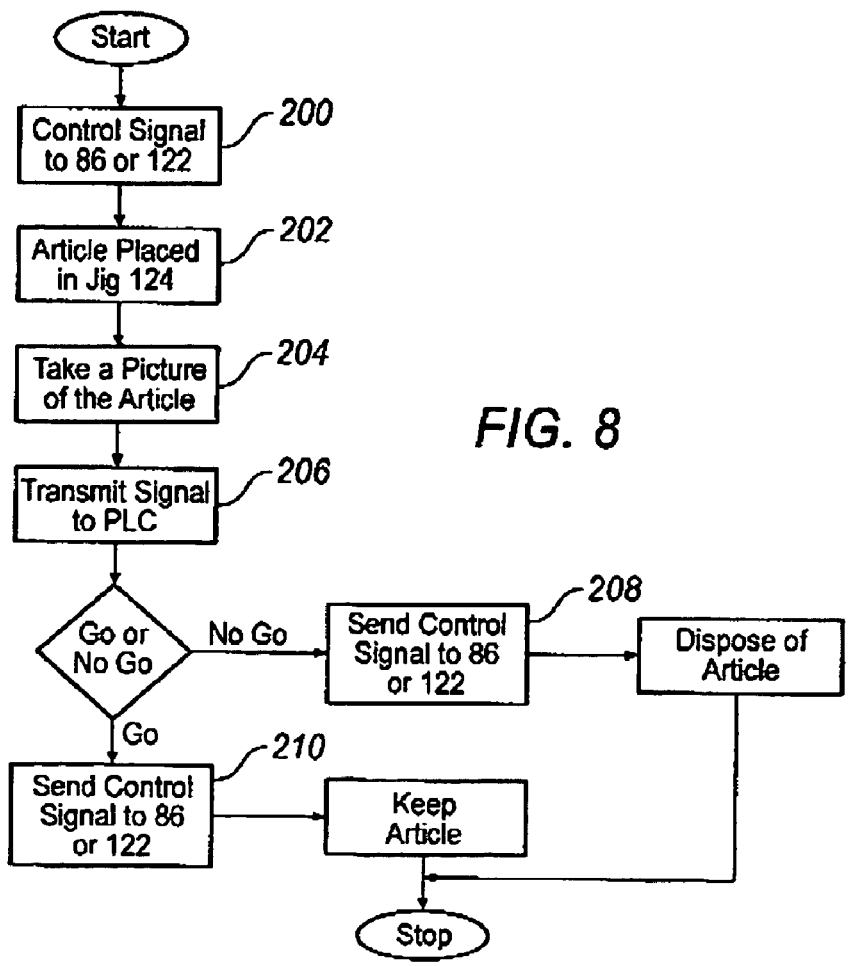
FIG. 8 is a flow chart of the operation steps corresponding to the block diagram of FIG. 7.

A preferred example of the flow of control signals associated with the control of an automation module 12 containing the above described vision system is shown in FIG. 7 and may take place in a series of sequential steps as shown in FIG. 8. In step 200, PLC 62 provides a control signal to automatic loading/unloading mechanism 122 (or to a user via user interface 86) instructing mechanism 122 to load an article 121 into a holding jig 124. In response, the automated loading mechanism 122 (or user) places article 121 into jig 124, step 202, so that camera 108 may take a picture of article 121. As indicated in step 204, vision control unit 106 provides a control signal to camera 108 instructing camera 108 to take a picture of the loaded article 121. After the picture is taken and the attributes of the image are analyzed by vision control unit 88 per the preprogrammed characteristics, vision control unit 88 transmits a "Go" or "No Go" signal to PLC 62 indicating whether or not the inspected article 121 was deemed conforming, as shown in step 206. In steps 208 and 210, PLC 62 responds to the "Go" or "No Go" signal from vision control unit 88 by sending a control signal to mechanism 122 (or user interface 86) instructing mechanism 122 to either dispose of a nonconforming article 121 or to forward a conforming article 121 to shipping.

Figure 9:
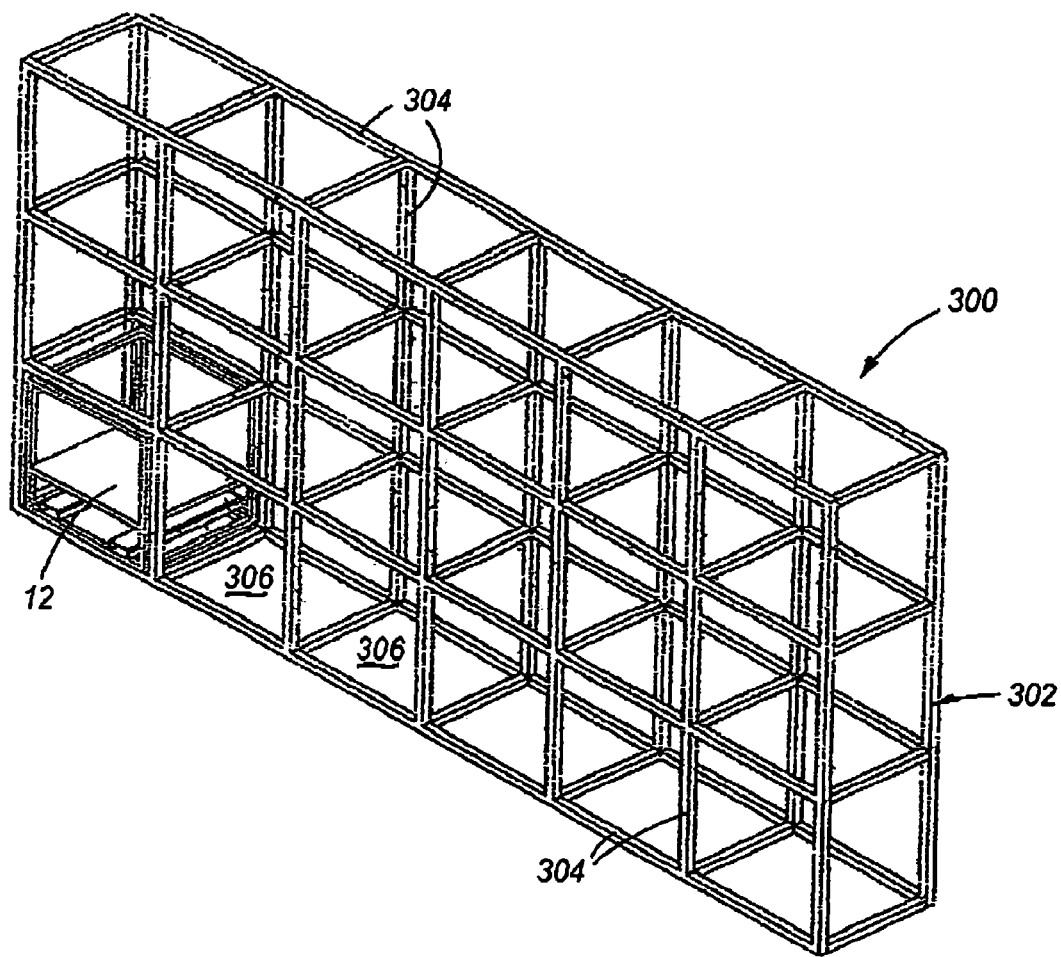
FIG. 9 is a perspective view of a storage rack according to a preferred embodiment of the present invention.

Referring to FIG. 9 of the drawings, a storage rack 300 may be provided for storing undocked automation modules 12. Rack 300 generally includes a frame 302 that is preferably rigid and constructed of joined tubular members 304 comprising a metal, such as steel. In a preferred embodiment, tubular members 304 are joined such that a plurality of bays 306 are created, each bay 306 sized to receive an individual automation module 12. Bays 306 may be arranged one bay deep, as illustrated in FIG. 9, or may be arranged two deep allowing undocked automation modules 12 to be inserted into bays 306 on either side of rack 300. It may also be appreciated that rack 300 may be configured to include any number of bays 306 in both height and length depending on the requirements of the manufacturing facility.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A modular automation apparatus, comprising:
   a base unit and an automation module;
   said base unit comprising a frame having a control cabinet affixed thereto that houses at least one programmable logic controller providing predetermined control function, said base unit adapted to receive an automation module;
   said automation module comprising a frame having a platform upon which at least one automation device is disposed, a selectively programmable memory device for storing logic rules to control said predetermined automation function, and a remote input-output device that communicates with said programmable logic controller for selectively controlling operation of said automation device, said automation module configured to mate with said base unit; and
   wherein when said base unit and a corresponding automation module are cooperatively assembled, said memory device downloads said logic rules into said programmable logic controller for execution, said programmable logic controller communicating with said remote input-output device in accordance with the executed logic rules to perform one or more predetermined automation functions.

2. A method of assembling an automation apparatus configured to perform one or more automation functions comprising:
   providing an automation apparatus comprising a base unit providing predetermined control function and an automation module providing predetermined automation function, the automation module including at least one selectively programmable memory device for storing information to be transferred into the base unit, the automation apparatus capable of performing one or more predetermined automation functions when said base unit and said automation module are cooperatively assembled;

assembling said automation module with said base unit to form a unitary automation apparatus; and downloading the stored information from said memory device into said base unit.

3. The method according to claim 2, wherein the step of assembling the automation module with the base unit includes connecting an electrical conduit between the base unit and the automation module.

4. The method according to claim 2, wherein the stored information includes at least one of logic rules and data.

5. A modular automation apparatus, comprising:

a base unit and an automation module;

said base unit providing predetermined control function, said base unit adapted to receive an automation module that is configured to mate with said base unit, wherein said automation module includes a frame having a platform and further includes at least one selectively programmable memory device for storing information;

said automation module providing predetermined automation function, wherein said selectively programmable memory device for storing information is used to control said predetermined automation function;

wherein when said base unit and said automation module are cooperatively assembled, the combination is capable of performing one or more predetermined automation functions; and wherein upon connection of said automation module to said base unit, said memory device downloads the stored information into said base unit.

6. The modular automation apparatus as recited in claim 5, wherein said automation module communicates electronically with said base unit.

7. The modular automation apparatus as recited in claim 6, wherein said automation module communicates with said base unit through an electrical conduit.

8. The modular automation apparatus as recited in claim 5, wherein said platform includes at least one automation device disposed thereon.

9. The modular automation apparatus as recited in claim 8, wherein said automation module includes a remote input-output device that communicates with said base unit for selectively controlling operation of said automation device.

10. The modular automation apparatus as recited in claim 5, wherein said information comprises at least one of automation specific logic rules and data.

11. The modular automation apparatus as recited in claim 5, wherein said predetermined control function provided by said base unit comprises the generation of signals required to operate said automation module.

12. The modular automation apparatus as recited in claim 5, wherein said base unit comprises a frame having a control cabinet affixed thereto.

13. The modular automation apparatus as recited in claim 12, wherein said control cabinet houses at least one control device.

14. The modular automation apparatus as recited in claim 13, wherein said control device comprises a programmable logic controller.

15. The modular automation apparatus as recited in claim 13, wherein said control device comprises a power supply capable of powering said base unit and said automation module.

16. The modular automation apparatus as recited in claim 12, wherein said control cabinet houses at least one automation specific control device.

17. The modular automation apparatus as recited in claim 16, wherein said automation specific control device comprises an automation device controller.

18. The modular automation apparatus as recited in claim 5, wherein said automation module includes a user interface.

19. The modular automation apparatus as recited in claim 18, wherein said user interface is configured to prompt a user to perform predetermined operation steps.

20. The modular automation apparatus as recited in claim 19, wherein said user interface is configured to accept user input responsive to prompting by said control unit.

21. The modular automation apparatus as recited in claim 18, wherein said user interface comprises a touch sensitive display.

22. The modular automation apparatus as recited in claim 18, wherein said predetermined control function provided by said base unit comprises the generation of control signals required to operate said user interface.

23. The modular automation apparatus as recited in claim 5, wherein said base unit further includes at least one safety device configured to prevent operation of said automation apparatus during a predetermined event.

24. The modular automation apparatus as recited in claim 23, wherein said safety device comprises a light curtain electronically controlled by said base unit, whereby when a user reaches through said light curtain into said automation module during said function preformed by said automation module that could result in injury, said base unit terminates operation of said automation module.

25. The modular automation apparatus as recited in claim 5, wherein said predetermined automation function comprises manufacturing a product.

26. The modular automation apparatus as recited in claim 5, wherein said predetermined automation function comprises verifying a product.

27. The modular automation apparatus as recited in claim 5, further including a storage rack for storing automation modules awaiting connection to said base unit.

* * * * *